United States Patent [19]

Stratton et al.

[11] Patent Number: 4,936,634
[45] Date of Patent: Jun. 26, 1990

[54] REMOVABLE WHEEL TREAD ADJUSTING DEVICE

[75] Inventors: Gary J. Stratton, Hudson; Carl E. Kittle, Cedar Falls; Robert L. Rigdon, Sr., Dunkerton; Michael D. Wagner, Cedar Falls; Lynn E. Porter, Geneva; John J. Freund, Dubuque; James A. Koch, Hudson, all of Iowa

[73] Assignee: Deere & Company, Moline, Ill.

[21] Appl. No.: 236,690

[22] Filed: Aug. 25, 1988

[51] Int. Cl.⁵ .............................................. B60B 35/10
[52] U.S. Cl. ...................................... 301/128; 301/111
[58] Field of Search ................ 301/1, 9 TV, 111, 112, 301/114, 115, 122, 128, 124 R; 403/369, 370, 371, 374; 295/43

[56] References Cited

U.S. PATENT DOCUMENTS

| | | |
|---|---|---|
| 2,676,849 | 4/1954 | Houck et al. ............................ 301/1 |
| 2,726,106 | 12/1955 | Houck ............................ 301/128 X |
| 2,829,725 | 4/1958 | Wurdelman ........................... 180/75 |
| 2,902,319 | 9/1959 | Mulder ................................. 301/128 |
| 3,771,832 | 11/1973 | Sipovic et al. .................... 301/9 TV |
| 3,847,441 | 11/1974 | Morkoski et al. ............... 301/9 TV |
| 4,290,654 | 9/1981 | Majkrazak et al. .............. 301/9 TV |
| 4,317,596 | 3/1982 | Lemmon ................................... 301/1 |

Primary Examiner—Russell D. Stormer

[57] ABSTRACT

A removable wheel tread adjusting device used for facilitating the axial displacement of a tractor wheel assembly is adaptable to the exterior surface of the wheel assembly and can be utilized for the same task on similar wheel assembly structures. Specifically, the removable adjusting device supports a gear which intermeshes with a rack extending lengthwise along the axle and is capable of receiving torque from a tool so as to effect the axial displacement of the wheel assembly relative to the axle.

32 Claims, 6 Drawing Sheets

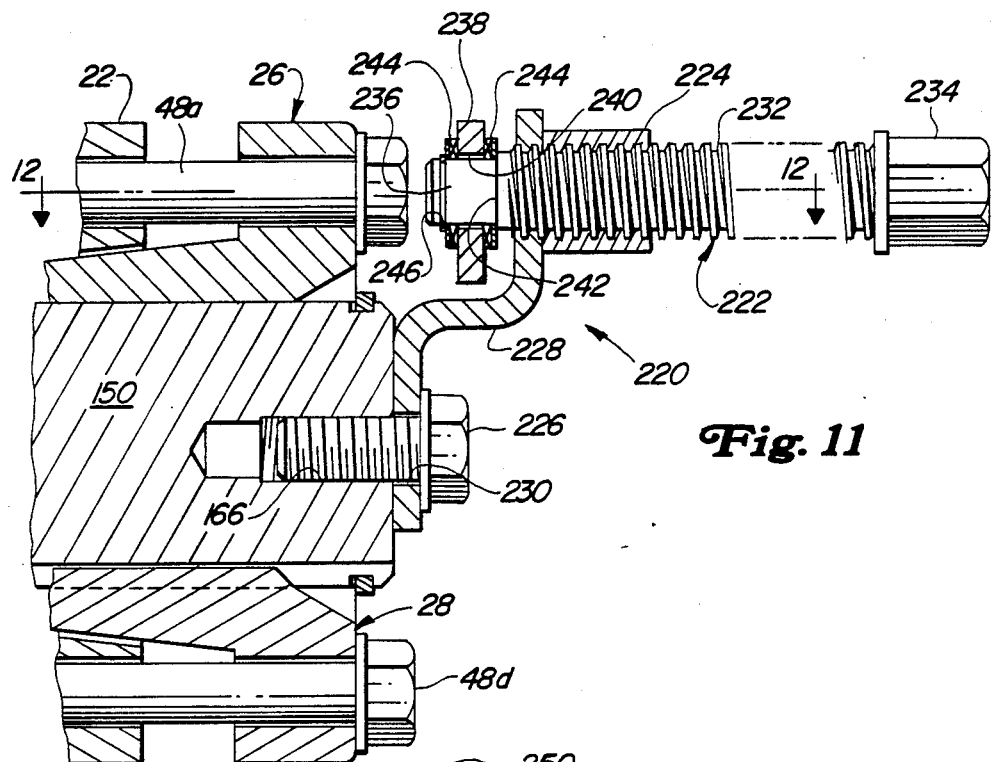
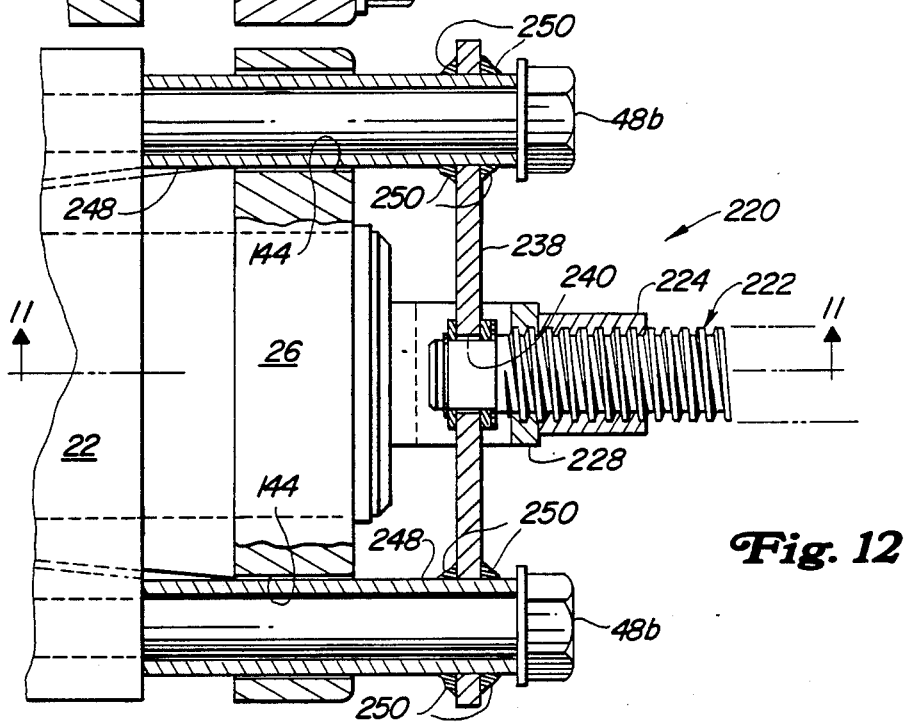
Fig. 11
Fig. 12

REMOVABLE WHEEL TREAD ADJUSTING DEVICE

BACKGROUND OF THE INVENTION

1. Field of the Invention

The present invention relates to devices for varying vehicle tread widths and, more specifically, for varying the tread width on agricultural vehicles.

2. Description of the Related Art

It has been desirable for many years to provide work vehicles, particularly agricultural tractors, with a mechanism for axially displacing their wheels. Such axial displacement, to either narrow or widen the wheel spacing, allows the operator to adapt the tractor to specific conditions, depending on the nature of the task to be performed. For example, the tread width can be changed to allow planting of crops at different row spacings.

Due to the large size and weight of tractor wheels, it can be appreciated that some mechanism normally is used to facilitate this operation. Many mechanisms involve the power of the tractor rotating the axles to literally "screw" the wheels in or out, such as those disclosed in U.S. Pat. Nos. 2,099,194 (Brown); 2,417,139 (Strehlow); 2,829,725 (Wurdelman) and 3,847,441 (Morkoski et al.). Another mechanism uses a plurality of circumferentially spaced fasteners attached to the wheel hub which engage one of a plurality of interior radial grooves provided on the rim, as shown in U.S. Pat. No. 3,771,832 (Sipovik et al.). U.S. Pat. No. 4,317,596 (Lemmon) teaches yet another mechanism, using a pinion gear housed within one of several arc-shaped wedges positioned between an axle and a wheel hub. Although these aforementioned patents and other patents in the related art may fulfill the criteria of axially displacing wheels, the very cost of their designs often limits their actual use.

U.S Pat. No. 2,676,849 (Houck et al.) introduces various embodiments of a tread-varying device which has been put to actual use for many years. The disclosure teaches using intermeshing toothed mechanisms to axially displace the tractor wheels, e.g., a rotatable pinion gear carried by the wheel hub or outer part that intermeshes with a toothed rack on the axle or inner part. With such a device, a farmer can use a tool to rotate the pinion, adjusting the wheel to a predetermined measurement with a minimum amount of physical effort. Even though Houck et al.'s invention performs quite well and is widely used, problems of high stress from torsional forces may arise in the wheel hub about the area of the pinion gear. This can be attributed primarily to the recent increase in the tractor horsepower being transmitted to the final drive axles. In the Houck et al. design, the wheel hub is cast with a cavity in which the pinion gear is received. This cavity gives the wheel hub an aesthetically pleasing appearance and provides for a protective body in which the pinion can be housed, but the removal of the metal to form the cavity may cause high stresses. Thus, elimination of the pinion gear, housed as an integral part of the wheel hub, would greatly reduce manufacturing costs as well as allow the wheel hub to be a symmetrical mass, without the stress-creating cavity.

SUMMARY OF THE INVENTION

Accordingly, it is an object of the present invention to maintain the function of utilizing a tool and intermeshing toothed mechanisms to assist in the axial adjustment of vehicle tread widths while eliminating the high torsional stresses occurring about the pinion cavity area of the wheel hub as disclosed in U.S. Pat. No. 2,676,849 (Houck et al.).

Further objects of the invention are to provide an externally mounted wheel tread adjusting device which is relatively inexpensive to manufacture; to provide a device which, after use, can be placed in a protective environment free from contaminants; to provide an externally mounted wheel tread adjusting device which will accommodate a variety of axle shaft sizes; to reduce the amount of physical effort previously required to adjust the wheel assembly through the use of a powered tool; to provide an attachable wheel tread adjusting device capable of receiving torque in a continuous manner, unrestricted by surrounding objects; and to reduce the overall manufacturing costs of producing large vehicle wheels by eliminating the cavity and pinion gear assembly provided therein.

In accordance with the aforementioned objects, the present invention provides a removable wheel tread adjusting device which facilitates the axial adjustment of tractor wheel assemblies. The wheel assembly is mounted to a longitudinally extending axle having a rack and keyway positioned lengthwise along the axle's periphery. The wheel assembly itself includes a wheel hub provided with a tapered central bore and a pair of arc-shaped wedges positioned between the axle and the wheel hub. The semi-circular, arc-shaped configuration of the wedges permits a sliding action along the axle and also conforms to the tapered central bore of the wheel hub. One of the wedges contains a key which aligns with a keyway in the axle to prevent the wheel from slipping circumferentially around the axle. Both of the wedges are provided with a radial flange containing bolt holes which align with the bolt hole pattern provided in the wheel hub.

The removable wheel tread adjusting device has a rotatable engaging mechanism, preferably a toothed spur gear, supported by leg members affixed to a mounting plate. The mounting plate is designed to bolt directly to the central hub of the wheel assembly, and straddles the axle. The shaft supporting the rotatable gear is provided with a tool adaptable portion with which a tool may be engaged to apply torque.

In order to move the wheel assembly axially along the axle, the clamping forces wedging the wheel assembly to the axle are relieved. The adjusting device then is fastened to the wheel assembly to allow the intermeshing of the teeth provided in the rotatable gear and the axle rack. By the use of a manually indexed or power-assisted tool, the gear can be continuously rotated in the desired direction to relocate the wheel assembly.

After the wheel assembly has been relocated, the adjuster is removed and the arc-shaped wedges are tightened into place. This procedure is repeated for every wheel requiring adjustment. After use, the adjusting device can be placed in a container and stored in a convenient location free from contaminants, ready for the next use.

In another embodiment, the tool engagement portion of the rotatable engaging mechanism is positioned parallel to the axle shaft axis.

In another embodiment, a worm gear is used in lieu of a spur gear.

In another embodiment, a rack means is provided on an axle shaft extension which bolts directly to the end of the axle shaft.

In another embodiment, a rotatable pinion gear is fastened to the end of the axle shaft while the accompanying rack is fastened rigidly to the wheel hub to provide the rack as an integral part of the wheel hub.

In another embodiment, the rack and pinion have been replaced with a threaded shaft rotatable within a threaded bore affixed to the end of the axle shaft by means of a bracket.

BRIEF DESCRIPTION OF THE DRAWINGS

A more complete understanding of the invention may be obtained from the detailed description that follows, taken with the accompanying drawings of the embodiments in which:

FIG. 11 is a cross-sectional view of a fifth embodiment of the invention.

FIG. 12 is a partial cross-sectional plan view of the fifth embodiment taken on line 12—12 of FIG. 11.

DETAILED DESCRIPTION OF THE PREFERRED EMBODIMENTS

In the following detailed description, references will be made to an individual adjustable wheel assembly, but it should be realized that the description and arrangement of components will be the same for any wheel on the vehicle requiring an axial adjustment.

Figure 1:
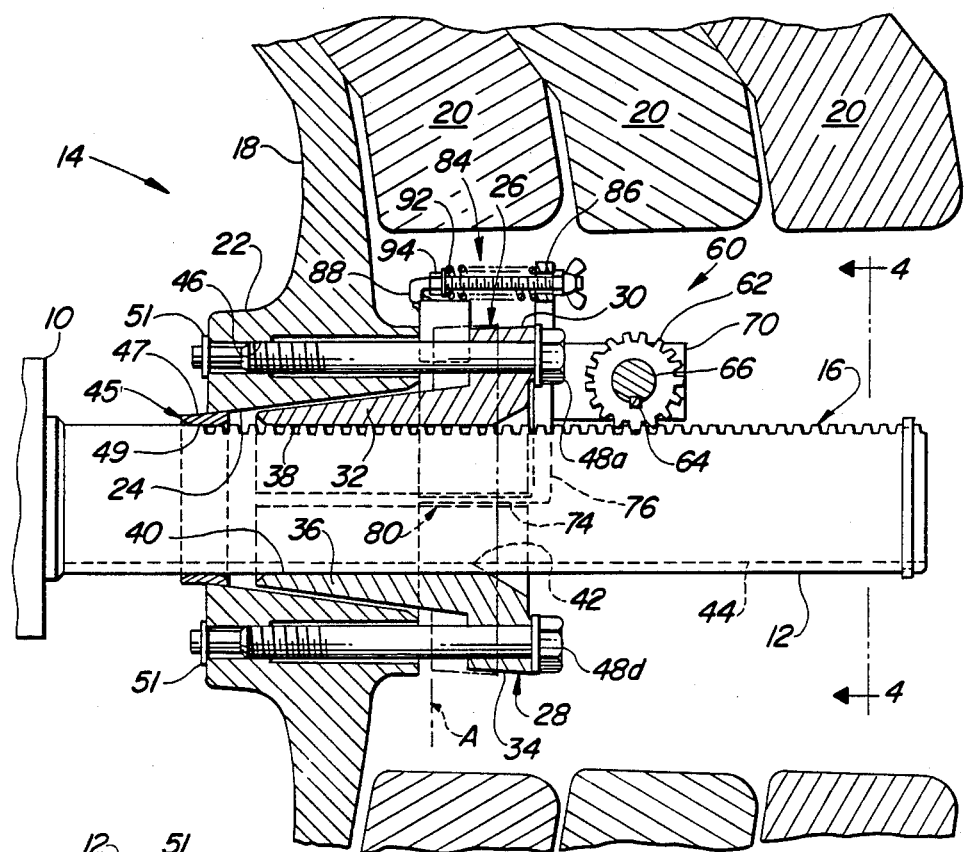
FIG. 1 is a cross-sectional view of a first embodiment of a wheel tread adjusting device according to the present invention.

Referring to FIG. 1, an axle shaft housing 10 extends transversely to the direction of vehicle travel. The axle shaft housing 10 is affixed to the vehicle chassis (not shown) and therefore is an integral part of the vehicle and not rotatable. Journalled within the axle shaft housing 10 are bearings (not shown) which support for rotation a cylindrical axle shaft 12 extending laterally and outwardly from the axle shaft housing 10. The axle shaft 12 is an integral part of the power train, and may be considered as the central supporting structure of the adjustable wheel assembly 14 and the vehicle chassis.

Located on an outer portion of the cylindrical axle shaft 12 are a plurality of arcuate-shaped teeth forming a rack 16, longitudinally extending a distance consistent with the range desired for axial adjustment of the wheel assembly 14.

The axle shaft 12 supports the adjustable wheel assembly 14, which comprises an outer wheel hub 18 provided with multiple wheel weights 20. Such wheel weights are optional, but are shown both to depict the confines of the available work space and to illustrate the massive weight involved in a typical tractor wheel assembly. The outer wheel hub 18 is provided with a central hub 22 having a tapered bore 24 large enough to accommodate the outside diameter of the axle shaft 12 and provide an annular tapered bore in which upper and lower tapered flanged sleeves, 26 and 28, respectively, can be received in a wedging action with the tapered bore 24. The upper tapered flanged sleeve 26 has a radially extending, semi-circular flange 30 and a semi-conical, axially extending portion 32. The lower tapered flanged sleeve 28 is of the same configuration as the upper sleeve 26, having a radially extending, semi-circular flange 34 and a semi-conical, axially extending portion 36. Together, semi-conical portions 32 and 36 provide a frustoconical mounting surface for the central hub 22. The sleeves 26 and 28 have semi-cylindrical inner surfaces 38 and 40, respectively, which, when tightened into position, encompass and clamp to the axle shaft 12. The lower sleeve 28 also is provided with a longitudinally extending key 42, which cooperates with a longitudinally extending keyway 44 provided in the axle shaft 12. The axial length of the keyway 44 again depends on the range desired for axial adjustment of the wheel assembly 14. Thus, the key 42 and keyway 44 restrain element 28 from circumferential rotation about the axle shaft 12, yet allow for axial displacement along the axle shaft 12.

Figure 2:
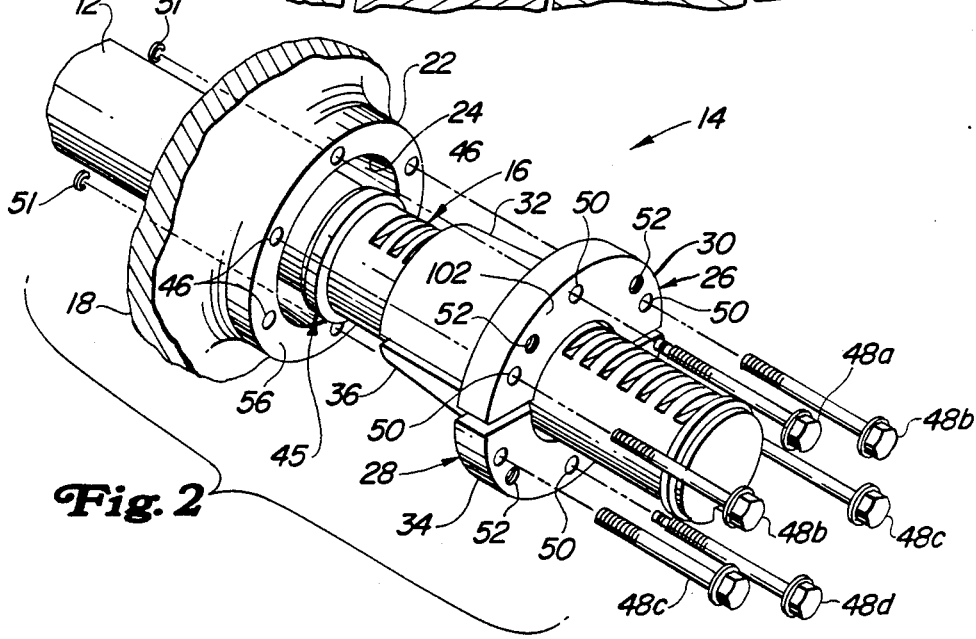
FIG. 2 is an exploded isometric view of a wheel assembly without the removable wheel tread adjusting device.

As shown in FIGS. 1 and 2, an annular collar 45 is slidably positioned on the axle shaft 12 between the wheel hub 22 and the sleeves 26 and 28 to maintain the wheel assembly 14 in a proper attitude and prevent binding after sleeves 26 and 28 have been loosened from the tapered bore 24. The collar 45 has a frustoconically shaped exterior portion 47 having a taper similar to, and a diameter larger than, the smallest diameter of the tapered bore 24. An interior radial bore 49 encompasses the axle shaft 12.

The central hub 22 of the wheel assembly 14 is provided with a plurality, preferably six, of angularly spaced threaded bolt holes 46. Received within the bolt holes 46 are a matching quantity of bolts 48a, 48b, 48c and 48d, numbered differently for reason which will become apparent. The semi-circular flanges 30 and 34 of the tapered flanged sleeves 26 and 28 are provided with a plurality of similar angularly spaced bolt holes 50, which coincide with the centerlines of the threaded bolt holes 46 contained in hub 22. Also provided in the flanges 30 and 34 are additional threaded bolt holes 52 spaced radially the same, but with a different angular relationship, as the holes 50. It is to be understood that all of the previously mentioned bores, threaded and non-threaded, extend through the item in which they are located.

Figure 3:
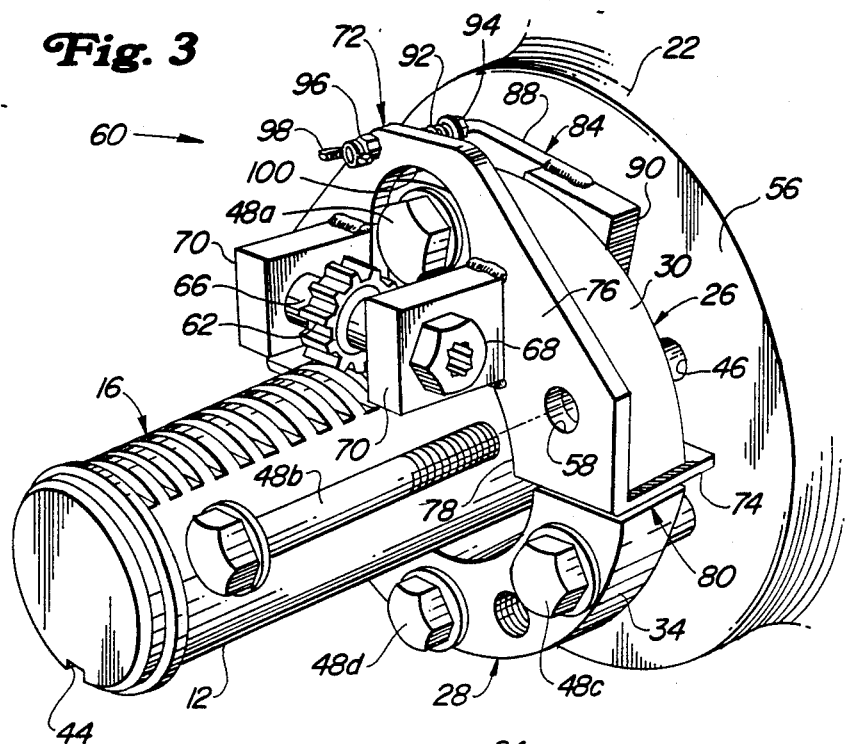
FIG. 3 is a perspective view of a wheel assembly of FIG. 1 with the removable wheel tread adjusting device partially mounted in place.
Figure 4:
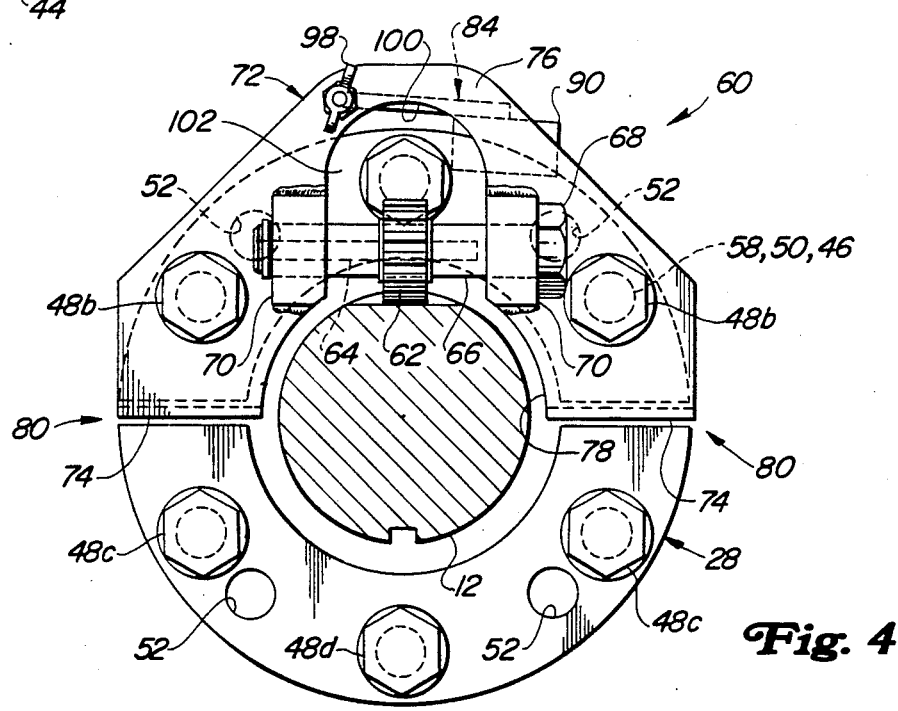
FIG. 4 is a front view of the first embodiment taken on line 4—4 of FIG. 1.

Referring to FIGS. 3 and 4, a removable wheel tread adjusting device 60 is shown partially fastened to the face 56 of the central hub 22 by the use of bolts 48b inserted through bores 58 and 50, and into threaded bores 46. The wheel tread adjusting device 60 has a rotatable tooth-engaging mechanism 62, shown here as a spur gear, which engages the rack 16 in the axle shaft 12. The spur gear 62 is keyed at 64 to a shaft 66 which is tool adaptable, that is, it is provided with a tool engagement portion 68. The shaft 66 in turn is supported at opposite ends by carrying members 70 longitudinally extending from a tripod mounting base 72. The tripod mounting base 72 is comprised of a pair of support legs 74 formed at right angles to a mounting plate 76 and a semi-circular aperture 78 to allow the adjusting device 60 to straddle the axle shaft 12. The support legs 74 insert into the slots 80 defined by the separation of sleeves 26 and 28 and abut the face 56 of the central hub 22 to serve as spacers. An adjustable leg assembly 84 completes the tripod mounting arrangement and is used to restrain the upper sleeve 26 from interferring with the operation of adjusting the wheel assembly. The leg assembly 84 is rotatably supported in an aperture 86 (see FIG. 1) provided in the mounting plate 76 and comprises an "L" shaped rod 88 supporting at one end a spacer or block 90 capable of being pivoted to a sandwiched position between the face 56 of the central hub 22 and the flange 30 of hub 26. At the end opposite the spacer block 90, the rod 88 is threaded and provided with a compression spring 92 located between stop nut 94 and the mounting plate 76. A jam nut 96 and wing nut 98 secure the assembly 84 to the mounting plate 76 and maintain the assembly 84 in a selected attitude to facilitate the mounting of the adjusting device 60 on the wheel hub 22. A U-shaped aperture 100 also is provided in the mounting plate 76 to allow the adjusting device 60 to seat flush against the face 102 of the upper sleeve 26.

To utilize the wheel tread adjusting device 60 on wheel assemblies having various axle shaft diameters, the gear 62 can be interchanged. The interchangability of the gear 62 also allows easy repair of the adjusting device 60 in the event of tooth-chipping, head stripping or shaft failure.

Assuming that an axial adjustment to a large vehicle wheel is to be performed, a step-by-step procedure follows which allows one to fully appreciate the novelty of the present invention.

FIGS. 1 and 2 best illustrate a large adjustable vehicle wheel assembly in a mode readied for axial adjustment. The phantom lines shown at A in FIG. 1 indicate the position of the upper and lower tapered flanged sleeves 26 and 28, respectively, when the wheel assembly 14 has been located to the desired axial location and bolts 48a, 48b, 48c and 48d have been properly torqued to specification. To ready the wheel assembly 14 for axial adjustment, the side of the tractor to which the adjustment is to be made must be jacked up to clear the tire from the ground. For convenience, the wheel is then rotated until the rack 16 is in its uppermost position (twelve o'clock).

The semi-conical portions 32 and 36 of the upper and lower sleeves 26 and 28, respectively, must be freed from the tapered bore 24 of the central hub 22. To facilitate this operation, bolts 48a and 48d are loosened. External snap rings 51 are provided in grooves on the ends of bolts 48a and 48d to ensure that the bolts cannot be removed from threaded engagement with their respective bores 46. The non-removal of bolts 48a and 48d maintains the sleeves 26 and 28 from falling off the axle 12, which might happen if all of bolts 48a–d were removed. Bolts 48b and 48c are then removed from engagement with their respective threaded bores 46 and placed in engagement with threaded bores 52 until they abut against the face 56 of the central hub 22. With the aid of an additional torque producing tool, the bolts 48b and 48c are sequentially tightened, thus forcing the upper and lower sleeves 26 and 28 to separate from the wedging induced by the tapered bore 24 acting on the semi-conical portions 32 and 36. The bolts 48 and 48c then are removed from threaded bores 52 and bolts 48c reinserted into their respective bores 50.

As best depicted in FIG. 3, the removable wheel tread adjusting device 60 is now positioned by aligning the apertures 58 with the apertures 50 and positioning the adjustable leg assembly between the face 56 of the hub 22 and the flange 30 of sleeve 26. Bolts 48b then are inserted and tightened in threaded bores 46, securing the adjusting device 60 to the central hub 22. The adjusting device 60 now functions as an integral unit of the wheel assembly 14 by the shouldering effect of the tripod base 72 against the face 56 of hub 22.

When the wheel assembly 14 is adjusted outwardly from the tractor, the annular collar 45 is slidably carried with it due to the wedging of the tapered surfaces 24 and 47. In the opposite or inward direction, the annular collar 45 may become dislodged from the tapered surface 24. In this event, the axially extending portions 32 and 36 of the sleeves 26 and 28 will abut the collar 45, forcing the collar 45 to slide along the axle 12 with the wheel assembly 14. The axial depth of the collar 45 is sufficient to maintain the wheel assembly 14 in continuous contact with at least a portion thereof.

A torque-producing tool is applied to the engagement portion 68 of the gear 62 and rotated in the desired direction, creating an intermeshing cooperation of the gear 62 and rack 16, axially sliding the wheel assembly 14 on the axle shaft 12.

After the wheel assembly 14 has been located to the desired new location, the wheel tread adjusting device 60 is removed, thus allowing it to be used on an adjacent wheel or placed in a protective environment, ready for the next use. The bolts 48b and c then are placed in their original bores. All bolts 48a–d are tightened, completing the wheel assembly adjustment.

In the following description of embodiments two through five, identical parts having the same function as previously described will have like reference numbers.

Figure 5:
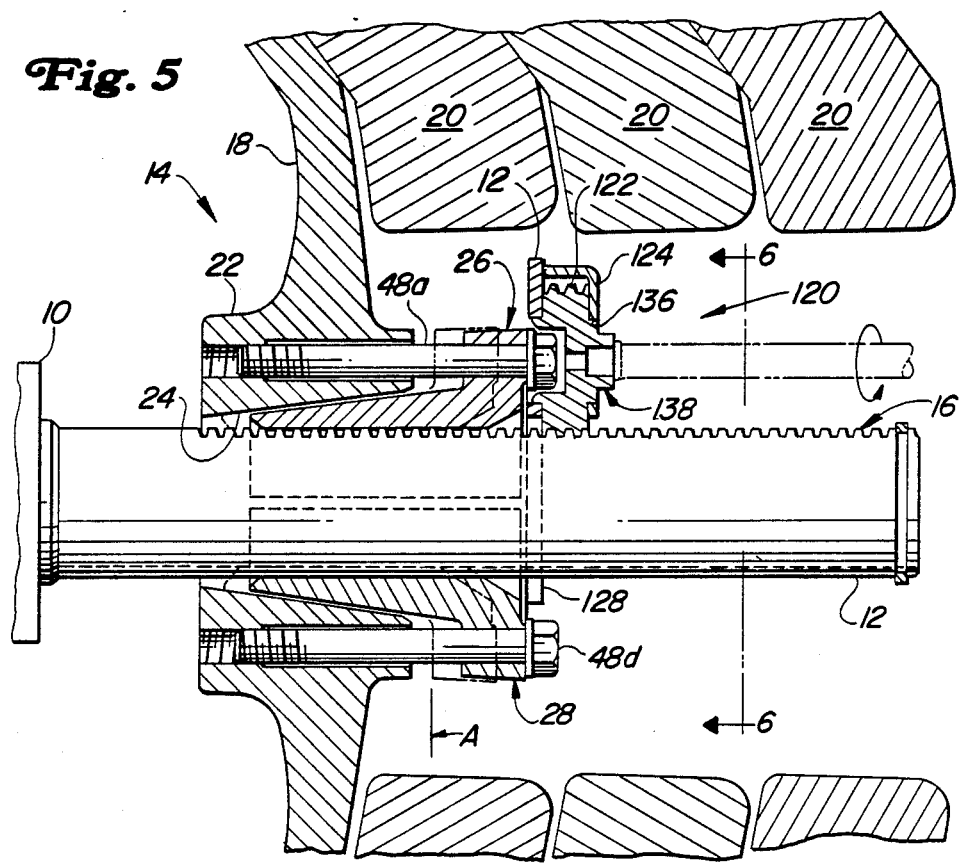
FIG. 5 is a cross-sectional view of the second embodiment.

Referring to FIG. 5, a second embodiment of a removable wheel tread adjusting device 120 is shown mounted to the wheel assembly 14.

Figure 6:
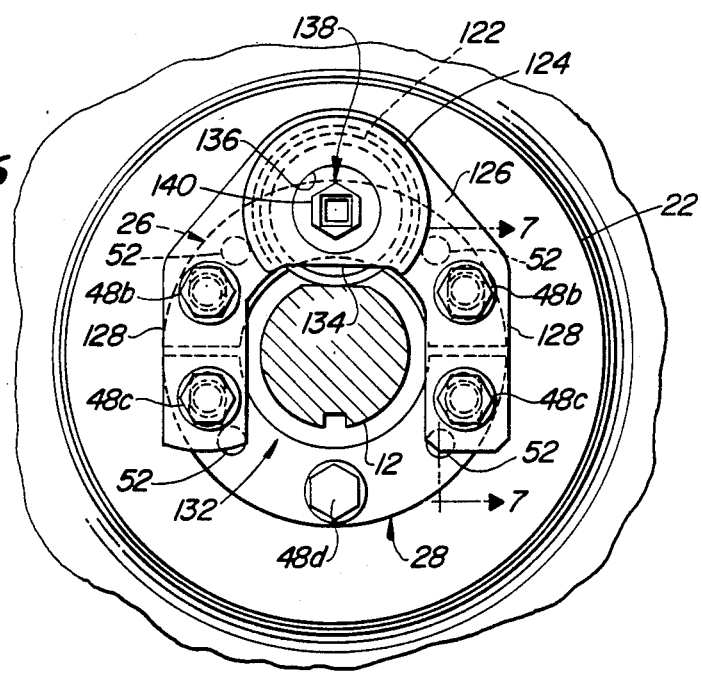
FIG. 6 is a front view of the second embodiment taken on line 6—6 of FIG. 5.
Figure 8:
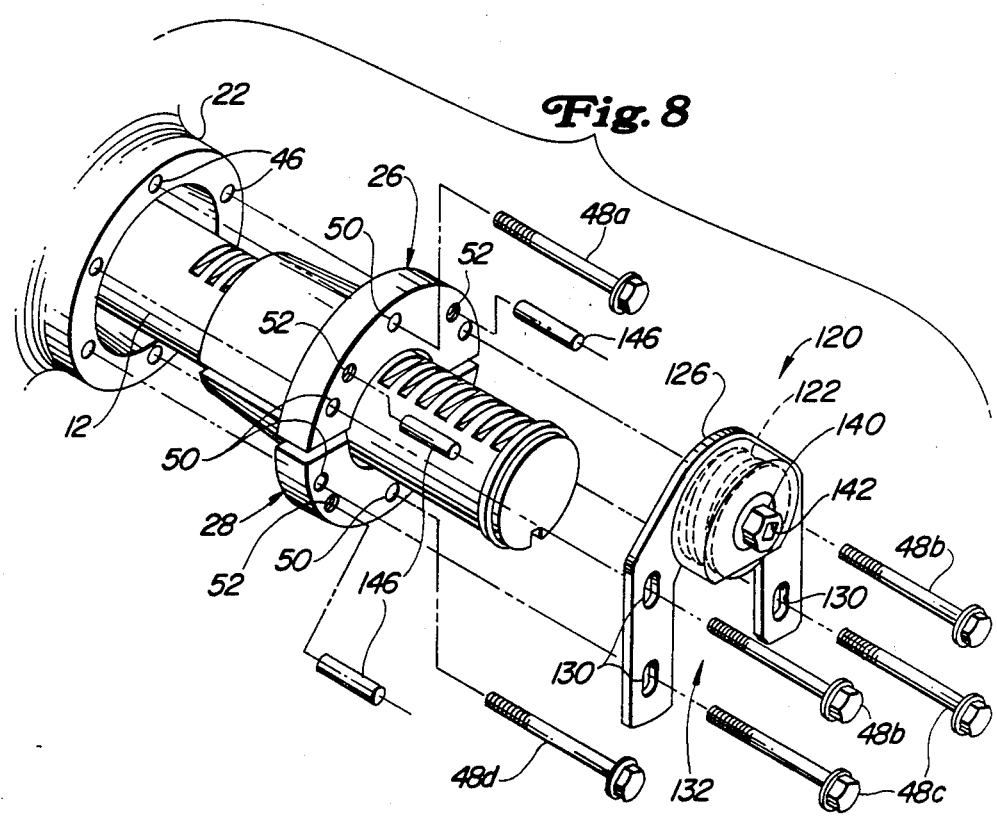
FIG. 8 is an exploded isometric view depicting the mounting arrangement of the second embodiment.

The removable wheel tread adjusting device 120 is comprised of a worm gear 122 supported for rotation by a circumferential housing 124 affixed to a mounting plate 126. As shown in FIGS. 6 and 8, the mounting plate 126 is formed in a "U" configuration with vertically extending leg portions 128. Provided within the leg portion 128 are slots 130 which are in axial alignment with apertures 46 and 50. The slots 130 are arranged to allow alignment with the hub bolt holes of alternate radial patterns and to ensure proper engagement of the worm gear 122 with the rack means 16. A multiplicity of axle shaft sizes can be readily fitted to the device 120 due to the open area 132 provided between legs 128. The circumferential housing 124 encasing the gear 122 is provided with an area 134 through which the gear teeth are exposed to engage the rack 16. An aperture 136 also is provided in the housing 124 to allow for a tool engagement portion 138 of the worm gear 122 to extend and be supported. The engagement portion 138 of the worm gear 122 is readily adaptable to either a wrench or socket type tool by using the hex head configuration 140 of the exterior portion or by use of a square shafted tool inserted into the square aperture 142 provided within the hex head 140.

Figure 7:
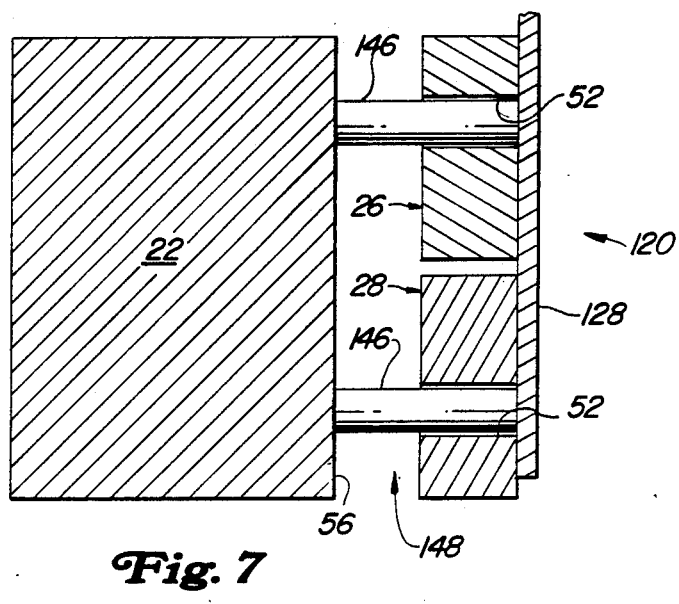
FIG. 7 is an enlarged cross-sectional view of the spacer arrangement of the second embodiment taken on line 7—7 of FIG. 6.

As depicted in FIG. 7, the adjusting device 120 is secured to the central hub 22 by the use of four spacers 146 in axial alignment with apertures 52. The spacers 146 are sandwiched in apertures 52 between the face 56 of the hub 22 and the legs 128 of the adjusting device 120, providing an annular space 148. The annular space 148 provides a space in which a wedge or like device (not shown) may be inserted to maintain the flanged sleeves 26 and 28 away from the central hub 22.

A torque-producing tool is applied to the engagement portion 138 of the worm gear 122 and rotated in the desired direction creating an intermeshing cooperation of the gear 122 and the rack 16 to slide the wheel assembly 14 axially on the axle shaft 12.

Figure 9:
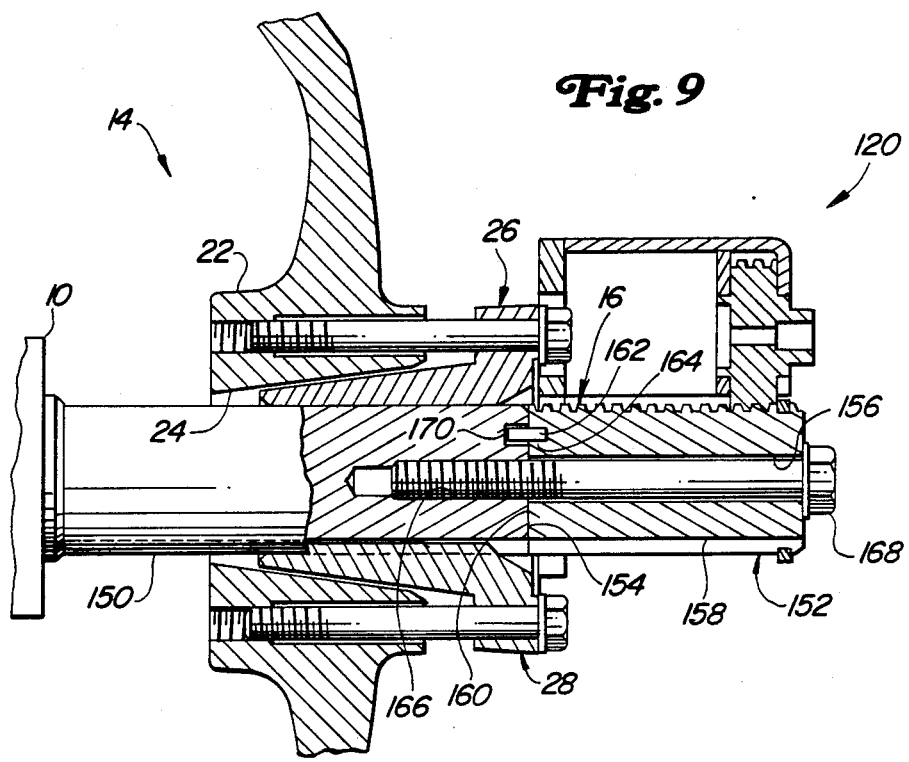
FIG. 9 is a cross-sectional view of a third embodiment of the invention.

The third embodiment shown in FIG. 9 allows use of the adjusting device of FIGS. 5–8 with an axle which does not have a rack formed therein. A cylindrical axle shaft 150 longitudinally extends from and is supported for rotation by the axle shaft housing 10. The adjustable wheel assembly 14 is secured for rotational movement with the axle shaft 150. In order to utilize the removable wheel tread adjusting device 120, as previously described in the second embodiment, a cylindrical axle extension 152 is adjoined to the distal end 154 of axle shaft 150. While the extension 152 is shown as having the same outside diameter as shaft 150, the space 132 provided in the adjusting device 120 will accommodate axle extensions of various diameters.

As shown in FIG. 9, the axle extension 152 is provided with a through bore 156, a longitudinally extending rack 16, and a longitudinally extending keyway 158 positioned 180 degrees from the rack 16 to accommodate the transverse motion of the lower tapered flanged sleeve 28. A cylindrical pin 162 is provided longitudinally extending from the mounting face 160 of extension 152 and press-fitted into a counterbore 164 of the face 160. The pin 162 serves as a positive stop to isolate the axle extension 152 from circumferential rotation when torque is applied to the adjusting device 120.

Minor modifications to the end 154 of axle shaft 150 must be made to accommodate the mounting of the axle extension 152. A counterbore 166 must be drilled and tapped with the appropriately sized threads to match the bolt 168. A second counterbore 170 in axial alignment with pin 162 also must be drilled. Utilizing pin 162 as a guide, the end portions 154 and 160 then are abutted, bolt 168 is inserted through the bore 156 and torqued to proper specification.

The sequence of operation previously described can now be implemented to facilitate the axial adjustment desired. Both the axle extension 152 and the removable wheel tread adjusting device 120 can then be removed and readied for their next use.

Figure 10:
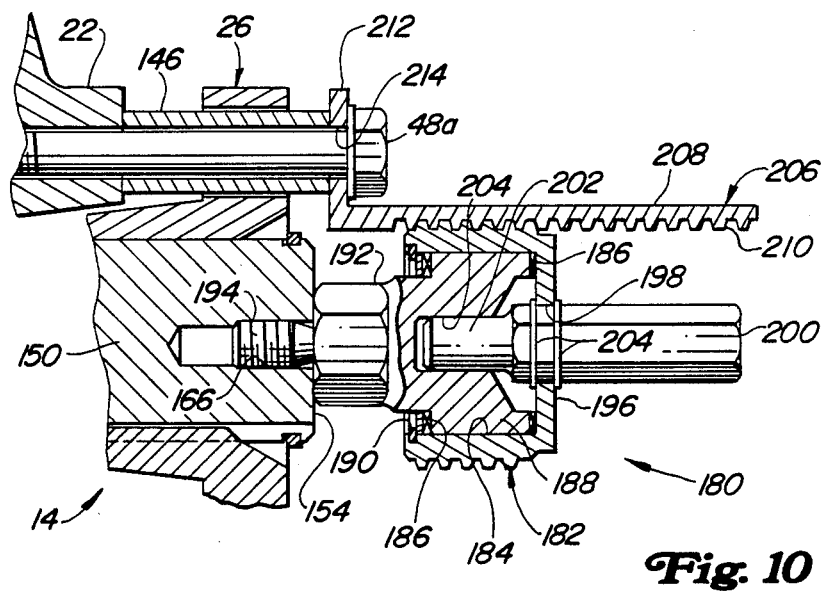
FIG. 10 is a cross-sectional view of a fourth embodiment of the invention.

A fourth embodiment of a removable wheel tread adjusting device is shown in FIG. 10. In this embodiment, the axle shaft 150 is in the same configuration as described in the third embodiment, that is, without the rack 16 provided on the shaft 150. This time, a removable wheel tread adjusting device 180 is attached directly to the end 154 of shaft 150. Again, shaft 150 must be counterbored and tapped to accommodate the mounting of adjuster 180.

The removable wheel tread adjusting device 180 comprises a rotatable gear 182 having a counterbore 184 and supported by bearings 186 journalled to an internal cylindrically shaped carrier 188. The gear 182 is retained in rotatable relationship on the carrier 188 by an internal snap ring 190. The carrier 188 has a longitudinally extending portion 192, shown here in the form of a hex body, although any suitable configuration may be used to allow a tool to adapt readily. Longitudinally extending from the portion 192 is a threaded shaft 194 which is threadedly engageable with threaded bore 166 in axle shaft 150. The items 194, 192 and 188 preferably are formed as an integral part.

Referring once again to the gear 182, an end wall 196 is formed as a result of the counterbore 184, which is provided with a hex aperture 198 for the retention of a tool engagement extension 200. Extension 200 is of a longitudinally extending hex configuration, to coincide with aperture 198, and is provided with a cylindrical projection 202 which inserts into a counterbore 204 in element 188 for additional stability under torquing conditions. To retain extension 200 in place as an integral part of tooth means 188, external snap rings 204 are placed on either side of an end wall 196.

The rack 206 now is mounted to the wheel assembly in a plane parallel to the axis of the axle shaft 150. It includes longitudinally extending leg 208 provided with a plurality of gear teeth 210 in intermeshing cooperation with gear 182, and a leg 212 extending perpendicular to the leg 208. The leg 212 is provided with an aperture 214 through which the bolt 48a can be inserted to mount the rack 206 as an integral unit of the wheel assembly 14.

The wheel assembly can now be adjusted to the desired location in the same manner as previously described.

A fifth embodiment of a removable wheel tread adjusting device is disclosed for readily displacing a vehicle wheel assembly when the axle shaft does not provide a rack. In this form of the invention, the rack and corresponding rotatable gear have been replaced with a continuously threaded bolt 222 and internally threaded receptable 224.

Again, the axle shaft 150 must be provided with a threaded bore 166 in which the removable wheel tread adjusting device 220 can be secured to the axle shaft by means of a bolt 226. The tapered sleeves 26 and 28 must be freed from the tapered bore 24 of the central hub 22 as previously described.

The adjusting device 220 has a "Z" bracket 228 provided at one end with an aperture 230 through which bolt 226 passes and secures the device 220 to the axle shaft 150. A cylindrical internally threaded receptacle 224 is affixed to and extends perpendicular from the bracket 228 parallel to the axis of the shaft 150 at the end of the bracket 228 opposite aperture 230. The threaded bolt 222 has a continuously threaded body 232, a hex shaped head 234 capable of receiving a tool-applied torque, and a longitudinally extending cylindrical portion 236 to which an arcuate bracket 238 is mounted. The bracket 238 is provided with a bore 240 larger than the body of portion 236 to allow free rotation of the bolt 222 therein. The cylindrical portion 236 of the bolt 222 has a smaller diameter than the body 232, and therefore a shoulder 242 is provided. The bracket 238 is sandwiched between thrust bearings 244, which in turn are held in place by the shoulder 242 and external snap ring 246. The aforementioned arrangement of the bracket and thrust washers will retain the bracket in proper vertical alignment when the torque is applied to the bolt 222.

As best shown in FIG. 12, the bracket 238 spans an arcuate distance great enough to allow the insertion of cylindrical collars 248 into and through the bores of 144 of sleeve 26. The collars 248 abut and shoulder against the face 56 of central hub 22 and are welded at their opposite ends to the arcuate bracket 238 as shown at 250. Bolts 48b again are threaded into bores 46, thus securing the adjusting device 220 to the central hub 22 to act as an integral unit of the wheel assembly. With the aid of a torque producing tool, bolt 222 is rotated to axially displace the wheel assembly to the desired location. The adjusting device 220 then is removed and the bolts 48a, 48b and 48c are tightened to secure the wheel assembly to the axle shaft. Although the embodiments are shown with particular gear designs, it can be appreciated that with minor modifications to the mounting bases, a spur gear can be utilized. Indeed, a rotatable tooth engaging means, a friction device, e.g. an elastomeric wheel contacting the axle shaft, could be utilized to perform the same function.

Various other features of the present invention not specifically enumerated herein will undoubtedly occur to those versed in the art, as will numerous modifications and alterations in the embodiments of the invention illustrated, all of which may be achieved without departing from the spirit and scope of the invention as defined in the appended claims.

We claim:

1. A wheel tread adjusting device for axially displacing along an axle, a wheel assembly mounted about the axle, the wheel tread adjusting device comprising:
   a mounting plate;
   selectively actuable moving means mounted to said mounting plate for moving said mounting plate along said axle;
   actuating means connected to said moving means for actuating said moving means; and
   attachment means for releasably attaching the mounting plate to the wheel assembly.

2. The wheel tread adjusting device of claim 1 wherein said mounting plate has an aperture formed therein for encompassing at least a peripheral portion of said axle.

3. The wheel tread adjusting device of claim 1 further comprising spacer means positioned between said wheel assembly and said mounting plate.

4. The wheel tread adjusting device of claim 1 wherein said moving means is rotatable.

5. The wheel tread adjusting device of claim 4 wherein said moving means positively or frictionally engages said axle.

6. The wheel tread adjusting device of claim 5 wherein said axle is provided with a rack, and wherein said moving means comprises a gear positively engageable with said rack.

7. The wheel tread adjusting device of claim 1 wherein said actuating means is adapted for driving engagement with a tool.

8. The wheel tread adjusting device of claim 1 wherein said wheel assembly is provided with a plurality of fastening means for selectively fastening said wheel assembly to said axle, and wherein said attachment means attaches said mounting plate to said wheel assembly using at least one of said fastening means.

9. The wheel tread adjusting device of claim 1 wherein said wheel assembly mounted about the axle further comprises:
   a wheel having a bore;
   at least one clamping means received within said bore for clamping said wheel to the axle;
   means for releasably attaching said clamping means to said wheel; and
   means for maintaining said wheel in a selected attitude.

10. The wheel tread adjusting device of claim 9 wherein said bore is tapered.

11. The wheel tread adjusting device of claim 9 wherein said clamping means comprises an inner radial surface encompassing at least a portion of said axle, an arcuate flange and an outer tapered surface laterally extending from said arcuate flange.

12. The wheel tread adjusting device of claim 9 wherein said means for releasably attaching said clamping means to said bore comprises at least one threaded rod.

13. The wheel tread adjusting device of claim 12 wherein said threaded rod has stop means for limiting the axial displacement of said clamping means relative to said wheel.

14. The wheel tread adjusting device of claim 13 wherein said stop means comprises an external snap ring positioned in a radial groove on said threaded rod.

15. The wheel tread adjusting device of claim 9 wherein said means for maintaining the wheel in a selected attitude comprises a collar slidably receivable on said axle and having an exterior surface cooperating with said bore to limit axial displacement of said collar relative to said wheel in at least one axial direction.

16. The wheel tread adjusting device of claim 15 wherein said collar exterior surface is tapered.

17. The wheel tread adjusting device of claim 16 wherein said bore is tapered and wherein the maximum diameter of said collar external surface is greater than the minimum diameter of said bore.

18. The wheel tread adjusting device of claim 17, wherein said collar is axially closer than said clamping means to the minimum diameter of said bore.

19. A wheel tread adjusting device for moving a member axially along a longitudinally extending shaft, comprising:
   a mounting plate;
   spacer means longitudinally extending from said mounting plate for spacing said mounting plate from the member;
   a carriage longitudinally extending from said mounting plate in a direction opposite from said spacer means; and
   rotatable positively or frictionally engageable means supported by said carriage for moving said mounting plate along the shaft.

20. The wheel tread adjusting device of claim 19 wherein said carriage contains portions defining at least one aperture.

21. The wheel tread adjusting device of claim 20 further comprising a transversely extending support means received in said at least one aperture and having said rotatable means mounted thereon.

22. The wheel tread adjusting device of claim 21 wherein said rotatable means comprises a gear keyed to said support means.

23. The wheel tread adjusting device of claim 21, wherein at least a portion of said support means is tool engageable.

24. The wheel tread adjusting device of claim 19 wherein said rotatable positive or frictionally engageable means comprises a gear.

25. The wheel tread adjusting device of claim 24 wherein said longitudinally extending shaft is provided with a rack with which said gear intermeshes.

26. A wheel tread adjusting device for axially displacing along an axle a wheel assembly mounted about the axle, the wheel tread adjusting device comprising:
   a mounting plate;
   attachment means on said mounting plate for releasably attaching said mounting plate to the wheel assembly;
   first and second spacer means longitudinally extending from said mounting plate for spacing said mounting plate from said wheel assembly; and
   a selectively actuable moving means mounted to said mounting plate for axially displacing said mounting plate along said axle.

27. The wheel tread adjusting device of claim 26 wherein said mounting plate contains portions defining an aperture encompassing at least a peripheral portion of said axle.

28. The wheel tread adjusting device of claim 26 wherein said attachment means also releasably retains said first spacer means between said mounting plate and said wheel assembly.

29. The wheel tread adjusting device of claim 26 further comprising pivotal fastener means for pivotally mounting said second spacer means to said mounting plate.

30. The wheel tread adjusting device of claim 29 wherein said pivotal fastener means is adjustable to adjust the longitudinal position of said second spacer means.

31. The wheel tread adjusting device of claim 29 wherein said second spacer means comprises a spacer block.

32. The wheel tread adjusting device of claim 31 wherein said means for releasably securing the wheel assembly to the axle comprises at least one wedging device having a radial flange capable of receiving at least one fastening means and wherein said attachment means retains said spacer block between said radial flange and the wheel assembly.

* * * * *